(12) United States Patent
Evertz et al.

(10) Patent No.: US 6,472,482 B1
(45) Date of Patent: Oct. 29, 2002

(54) GAS-PHASE POLYMERIZATION WITH DIRECT COOLING

(75) Inventors: Kaspar Evertz, Schifferstadt; Manfred Sandkühler, Grünstadt; Walter Schicketanz, Frankenthal, all of (DE)

(73) Assignee: Basell Polyolefine GmbH, Kehl (DE)

( * ) Notice: Subject to any disclaimer, the term of this patent is extended or adjusted under 35 U.S.C. 154(b) by 0 days.

(21) Appl. No.: 09/822,218

(22) Filed: Apr. 4, 2001

(30) Foreign Application Priority Data

Apr. 4, 2000 (DE) .......................................... 100 16 625

(51) Int. Cl.[7] .................................................. C08F 2/34
(52) U.S. Cl. .............................. 526/68; 526/61; 526/68; 526/348.2; 526/348.5; 526/348.6
(58) Field of Search .......................... 526/68, 76, 348.2, 526/348.5, 348.6

(56) References Cited

U.S. PATENT DOCUMENTS

| | | |
|---|---|---|
| 4,543,399 A | 9/1985 | Jenkins, III et al. .......... 526/70 |
| 4,588,750 A | 5/1986 | Boris ........................ 514/765 |
| 5,352,749 A | 10/1994 | DeChellis et al. ............. 526/68 |

FOREIGN PATENT DOCUMENTS

| | | |
|---|---|---|
| CA | 2136746 | 2/1993 |
| DE | 42 18 369 | 12/1993 |
| EP | 089 691 | 9/1983 |
| EP | 108 710 | 5/1984 |
| EP | 475 603 | 3/1992 |
| GB | 2 008 492 | 6/1979 |
| JP | 07062009 | 3/1995 |
| JP | 09049703 | 8/1995 |
| WO | WO 94/28032 | 12/1994 |

*Primary Examiner*—David W. Wu
*Assistant Examiner*—William K Cheung
(74) *Attorney, Agent, or Firm*—Keil & Weinkauf (57) ABSTRACT

Polyolefins, preferably polyethylene, are prepared in a continuous gas-phase polymerization process in which the fluid monomeric component, preferably ethylene, and, optionally, one or more comonomers is/are polymerized in the polymerization zone of a fluidized-bed reactor in the presence of one or more catalysts, optionally with the addition of various auxiliaries, under reaction conditions where the fluidizing gas is circulated to remove the heat of polymerization or reaction and the polymerization product is taken from the circuit and the corresponding amount of monomer and, optionally, comonomers and optionally further auxiliaries are fed in, wherein the fluidizing gas discharged from the fluidized-bed reactor is cooled by means of a direct cooling apparatus in which the coolant is brought into direct contact with the fluidizing gas and heated coolant is passed to at least one further cooling stage in order to cool it and is, after cooling, wholly or partly returned to the direct cooling apparatus and/or heated or cooled coolant is wholly or partly returned to the reactor.

19 Claims, 5 Drawing Sheets

GAS-PHASE POLYMERIZATION WITH DIRECT COOLING

The present invention relates to a gas-phase polymerization apparatus and a gas-phase polymerization process for preparing polyolefins, preferably polyethylene, in which the fluid monomeric component, preferably ethylene, and, optionally, one or more comonomers is/are polymerized in the polymerization zone of at least one fluidized-bed reactor in the presence of one or more catalysts under reaction conditions where the fluidizing gas is circulated to remove the heat of polymerization or reaction and the polymerization product is taken from the circuit and the corresponding amount of monomer and, optionally, comonomers are fed in.

Gas-phase polymerization processes are economical processes for the polymerization of olefins such as ethylene and propylene or for the copolymerization of olefins with $C_3$–$C_8$-olefins. Such gas-phase polymerization processes can be configured, for example, either as gas-phase fluidized-bed processes or as stirred gas-phase processes. Such processes are described, for example, in EP-A-0 475 603, EP-A-0 089 691 and EP-A-0 571 826.

A characteristic of the gas-phase fluidized-bed process is that the bed consisting of polymerizing polymer particles is kept suspended by a gas mixture flowing in from below. The heat of polymerization or reaction liberated is carried from the reactor by the abovementioned gas mixture. The fluidizing gas is cooled by indirect cooling in a heat exchange zone located outside the reactor and is generally returned to the reactor through a gas distributor plate (circulating gas or fluidizing gas).

Gas-phase fluidized-bed processes for preparing polyolefins are customarily carried out in a vertical, cylindrical reactor at superatmospheric pressure and elevated temperature. For example, the gas-phase fluidized-bed polymerization of ethylene is carried out at an internal reactor pressure of about 25 bar and a temperature of about 110° C.

The monomer fed in with the fluidizing gas is reacted by means of a catalyst and, optionally, cocatalysts and various auxiliaries in the fluidized-bed reactor to give the corresponding polyolefins, usually in the form of a pulverulent polymerization product. The particles of polymer powder which essentially form the fluidized bed are generally discharged from the fluidized-bed reactor via a continuously open or intermittently open orifice. The (substantial) separation of gas and powder is carried out in one or more precipitation systems at lower pressure. In addition, the fluidized-bed reactor generally has a disengagement zone at its upper end and additionally, if desired, a plurality of downstream stages to avoid or to reduce entrainment of particles.

The polymerization of olefins carried out in the gas-phase fluidized-bed process liberates a considerable quantity of heat of polymerization or reaction which is essentially taken up by the fluidizing gas. As a result, the fluidizing gas leaving the fluidized-bed reactor at its upper end has a correspondingly higher temperature than when it enters the fluidized-bed reactor. The circulated fluidizing gas therefore has to be cooled in a heat exchange zone to remove the heat of reaction or polymerization prior to being returned to the reactor.

A number of apparatuses and processes for cooling the circulated fluidizing gas are described in the prior art. In all the previously disclosed processes and apparatuses, cooling is carried out by means of indirect heat exchange, for example over conventional heat exchangers such as shell-and-tube heat exchangers. The corresponding cooling apparatuses for indirect heat exchange will hereinafter be referred to as recycle gas coolers.

Part of the heat of reaction or polymerization evolved is generally removed via the wall of the usually uninsulated reactor. JP 070/620/09-A and JP 09/497/03-A describe apparatuses for the indirect cooling of the reactor wall, for example by means of pipes through which cooling water flows.

For a long time, the recycle gas was cooled by means of indirect cooling to a recycle gas temperature slightly above the dew point of the recycle gas. The dew point is the temperature at which the (recycle) gas begins to condense. One of the reasons why the recycle gas was always cooled only to a temperature just above the dew point was the assumption that the introduction of liquid into a gas-phase fluidized-bed reactor would unavoidably lead to formation of lumps and/or to blockage of the distributor plate.

More recently, a significant increase in the performance (space-time yield) of the gas-phase polymerization process has been able to be achieved by deliberately cooling the heated recycle gas to below the dew point. When the resulting two-phase mixture consisting of condensed and gaseous fluid is introduced, the condensate vaporizes and thus takes up part of the heat of reaction (known as "Condensed Mode"). EP 0 089 691-B1, U.S. Pat. No. 4,543,399, U.S. Pat. No. 4,588,750 and U.S. Pat. No. 5,352,749 claim indirect cooling where at least part of the recycle gas is cooled below the dew point to form a two-phase mixture and this is recirculated to the reactor. Increasing the proportion of condensate by deliberate addition of higher-boiling components which thus condense at higher temperatures is also claimed. Furthermore, U.S. Pat. No. 4,588,750 describes the introduction of monomers in liquid form into the reactor below the fluidized bed. The introduction of the abovementioned components which vaporize under the reaction conditions effects additional evaporative cooling in the reactor.

U.S. Pat. No. 5,352,749 likewise discloses indirect cooling in which, however, the liquid condensate phase is separated from the two-phase mixture of the recycle gas before being returned to the reactor. An analogous procedure is employed in BP's "Innovene" polyethylene process (WO 9428032).

In all the abovementioned processes, the heat of reaction evolved in the gas-phase polymerization is removed by means of an indirect cooling apparatus. The process step of indirect cooling or partial condensation of the fluidizing gas, which is at the same time the circulated gas, is generally carried out in one or more heat exchangers. Typically, shell-and-tube heat exchangers or plate heat exchangers are used. A fundamental disadvantage of indirect cooling is that gas-side heat transfer is relatively poor. Considerable specific heat transfer areas are therefore necessary, which results in high equipment costs. In addition, the poor heat transfer intrinsic in the mode of construction also has an unfavorable effect on the energy consumption. Furthermore, the control of indirect cooling apparatuses is fundamentally very poor or is possible only with substantial time delays, so that they generally do not allow fine regulation of heat removal. Although the specific heat transfer area can be reduced when cooling to temperatures below the dew point because of the resulting two-phase system, very large heat transfer areas are still necessary, as indirect cooling processes are generally relatively ineffective.

In addition, a certain amount of finely divided polymer is carried from the reactor by the circulating gas and introduced into the circulated gas system. These polymer particles contain active catalyst and can thus also polymerize further in the circulated gas system. If these particles deposit in the circulated gas system, fouling can result in these places. These deposits can cause malfunctions (e.g. blockage of the cooler) and can also partly flake off again. The flaked-off deposits can then quickly block holes in the gas distributor plate of the reactor and thus necessitate shutdown and costly cleaning of the reactor. If such pieces of the deposits get through the gas distributor plate into the reactor, the product quality is adversely affected by these particles since they result in formation of specks. Particularly in the case of products for film applications, material which does not conform to specifications may be produced as a result.

It is an object of the present invention to provide a gas-phase polymerization process for preparing polyolefins which has the performance of processes known from the prior art and at the same time avoids the abovementioned disadvantages of the prior art in respect of high equipment costs for the process step of indirect cooling or partial condensation of the circulated gas. A further object is to find a way of substantially preventing the formation of polymer deposits in the circulated gas line of gas-phase polymerization reactors, of increasing the running time of such plants and of improving the quality of the polymerization products.

Further objects are indicated in the following description of the invention.

We have found that these objects are achieved in respect of the process by the features of claim 1.

Advantageous embodiments of the process of the present invention are defined in the subordinate process claims.

The present invention provides a gas-phase polymerization process for preparing polyolefins, preferably polyethylene, in which the fluid monomeric component, preferably ethylene, and, optionally, one or more comonomers is/are polymerized in the polymerization zone of at least one fluidized-bed reactor in the presence of one or more catalysts under reaction conditions where the fluidizing gas is circulated to remove the heat of polymerization or reaction and the polymerization product is taken from the reactor and the corresponding amount of monomer and, optionally, comonomers and optionally further auxiliaries such as molecular weight regulators, antistatics, etc., are fed in, wherein the fluidizing gas discharged from the fluidized-bed reactor is cooled by means of a direct cooling apparatus in which the coolant is brought into direct contact with the fluidizing gas and heated coolant is passed to at least one further cooling stage in order to cool it and is, after cooling, wholly or partly returned to the direct cooling apparatus and/or heated or cooled coolant is wholly or partly returned to the reactor.

The gas-phase polymerization apparatus of the present invention comprises at least
  one or more fluidized-bed reactor(s), preferably having one or more inlets and, if appropriate, nozzles for introduction of coolant for the purpose of contacting it directly with fluidizing gas,
  at least one cooling apparatus having one or more inlets for introduction of coolant for the purpose of contacting it directly with fluidizing gas,
  optionally, a droplet precipitator which is preferably located downstream of the cooling apparatus,
  optionally, a purification apparatus which is preferably integrated into the cooling apparatus or is connected thereto, for the purification of fluidizing gas and/or fluidizing gas condensate and/or coolant, and
  optionally, further polymerization reactors upstream and/or downstream of the fluidized-bed reactor or the fluidized-bed reactors.

The purification apparatus integrated into the cooling apparatus can, optionally, be configured so that it at the same time represents the cooling apparatus.

The direct cooling apparatus employed according to the present invention is installed downstream of the polymerization zone of the fluidized-bed reactor and is preferably located outside the fluidized-bed reactor. In the direct cooling apparatus employed according to the present invention, the fluidizing gas is brought into direct contact with a coolant, preferably a cooling liquid, which is cooler than the fluidizing gas. The gas stream which has been cooled by direct contact with the colder liquid stream is, if desired after passing through a droplet precipitator, fed back into the reactor by means of a transport device. This transport device can also be installed upstream of the direct cooling apparatus used according to the present invention. Depending on the physical conditions (pressure, temperature, phase equilibrium behavior, process engineering parameters of the gas/liquid contact), the components of the fluidizing gas dissolve and condense in the cooling liquid or components of the cooling liquid flow over into the fluidizing gas, since the cooling liquid in principle comes into direct contact with the heated fluidizing gas in the process of the present invention. A steady state between the gas stream leaving the direct cooling apparatus and the cooling liquid is therefore established provided that the operating parameters remain unchanged. To cool the heated fluidizing gas directly by means of a cooler liquid, it is necessary to create an appropriate liquid/gas contact area. Owing to the significantly better and more effective heat transfer compared to an indirect cooling apparatus, the present invention requires less complicated apparatuses than in the case of corresponding indirect cooling apparatuses. Direct cooling can, particularly if the direct cooling apparatus operates in cocurrent and has an appropriate design, e.g. utilizing the venturi effect, advantageously cause lower pressure drops than does indirect cooling. The direct cooling apparatus employed according to the present invention has also been found to be particularly advantageous when used in polymerization plants which have not only at least one fluidized-bed reactor but also at least one further upstream and/or downstream polymerization reactor, for example a loop reactor, since satisfactory heat removal is also ensured in such plants because of the particularly effective heat transfer in the cooling apparatus used according to the present invention.

A preferred embodiment of the gas-phase polymerization process of the present invention comprises the use of from 2 to 10, preferably from 2 to 5, fluidized-bed reactors and/or polymerization reactors. Particular preference is given to using 3, 4, 5, 6, 7, 8 or 9 fluidized-bed reactors.

A direct cooling apparatus can, for example, comprise a vessel in which one or more layers of one or more nozzles or other distribution devices distribute the cooling liquid. This can be done using internals such as packing, baffles or contact trays, for example sieve trays, which effect better gas/liquid contact, and, optionally, collector trays can be provided between the layers of nozzles or distribution devices in order to collect the cooling liquid and thus make it possible for the liquid throughput to be advantageously closely matched to the gas throughput and thus finally heat removal. The direct cooling apparatuses can be operated either in cocurrent, in countercurrent or in the crossflow mode, or using a combination of these principles.

The cooling liquid used according to the present invention for direct cooling comprises an inert and/or unsaturated component. The cooling liquid can also comprise monomers and/or comonomers, e.g. hexene, and/or downstream products derived from the monomers and comonomers, for example dimers, trimers and/or oligomers. The cooling liquid can also be a fluid which is in any case present in the reaction system or is introduced into the reactor together with a reaction component. Furthermore, the fluid functioning as cooling liquid can also be an additive necessary for the reaction. Thus, the cooling liquid in the gas-phase polymerization process of the present invention can be a reactant or a component necessary for the reaction. In a preferred embodiment, the cooling liquid can correspond to the condensate of the fluidizing gas.

Preferred cooling liquids or cooling liquid components for the direct cooling apparatus employed according to the present invention are saturated branched, unbranched or cyclic hydrocarbons, particularly preferably hexane. Cooling liquids or cooling liquid components which can be used according to the present invention also include relatively low-boiling materials, for example butane or pentane. According to the present invention, the heat exchange fluid can also be high-boiling, for example higher alkanes or cycloalkanes.

The composition of the components leaving the direct cooling apparatus finally depends on the physical properties of the fluidizing gas and the cooling liquid present, on the physical conditions, e.g. pressure, temperature and phase equilibrium behavior, and on the process engineering conditions during cooling (i.e. phase behavior, mass transfer and heat transfer conditions, etc.).

In continuously operated gas-phase polymerization reactions, the gaseous stream comprising one or more monomers or comonomers is passed continuously through a fluidized-bed reactor under reaction conditions in the presence of one or more catalysts or cocatalysts. The gaseous stream, hereinafter referred to as fluidizing gas, which comprises unreacted, gaseous monomer is discharged from the fluidized-bed reactor, compressed and then cooled by means of the direct cooling apparatus and returned to the reactor, or firstly cooled by means of direct cooling, then compressed and returned to the reactor. The product is taken off from the reactor and the corresponding amount of replacement monomers or comonomers is added to the recycle stream before it enters the fluidized-bed reactor or is introduced directly into the fluidized-bed reactor. The temperature of the fluidizing gas within the reactor has to be maintained at a level which is not only below the decomposition temperatures of the polymeric product and the catalyst but is also below the softening point or melting point of the polymeric product particles formed, since otherwise there will be formation of polymer lumps which cannot be discharged continuously and would also lead to blockage of the reactor.

According to the present invention, the fluidizing gas to be recirculated is cooled to the required temperature in a direct cooling apparatus. The fluidizing gas is compressed before or after it enters the direct cooling apparatus, and is then brought into direct contact with the cooling liquid in the cooling apparatus. In this way, it is possible to achieve significantly better heat transfer and more efficient cooling than in the indirect cooling apparatuses described in the prior art (for example shell-and-tube heat exchangers).

The cooler of the present invention can be operated either in the crossflow mode, in cocurrent or in countercurrent or using a combination of these principles. In addition, the cooling apparatus used according to the present invention can comprise injection devices, collector trays, baffles, contact trays and/or packing which make it possible for the liquid throughput to be very closely matched to the gas throughput. According to the present invention, direct cooling of the fluidizing gas can also be carried out in a liquid compressor, e.g. in a liquid jet compressor.

The present invention provides a process in which the heated fluidizing gas is cooled by means of direct cooling and the gaseous cooled fluidizing fluid is returned to the fluidized-bed reactor. The invention further provides for the heated fluidizing gas to be, optionally, cooled to below the dew point. The two-phase mixture of fluidizing gas which may be formed in the direct cooling apparatus can be fed into the fluidized-bed reactor, optionally with substantial phase separation, at one or more points below and/or above the fluidized bed and/or at the level of the fluidized bed so as to control heat removal or cooling of the reactor in a targeted manner. In a preferred embodiment, the condensate which forms is taken up by or mixes with the cooling liquid by means of which the direct cooling is operated, and the resulting excess over the mass balance is, if desired after removal of solid particles, wholly or partly fed to the fluidized-bed reactor.

The present invention provides for the condensate formed in the direct cooling apparatus, which may be composed of cooling liquid and condensed fluidizing gas, to be introduced, for example injected, at one or more-points in the reactor and thus contribute, owing to the additional evaporative cooling, to maintaining the desired reaction temperature. The present invention further provides for cooling liquid to be, if desired, fed in to maintain the mass balance.

The present invention further provides an apparatus for gas-phase polymerization which largely prevents formation of polymer deposits in the fluidizing gas or circulated gas line of gas-phase polymerization reactors after passage through this apparatus and thus significantly increases the running time of such plants. The direct cooling apparatus simultaneously functions as a scrubbing apparatus or dust scrubber. The heated fluidizing gas fed to the cooling apparatus typically contains amounts of solid dusts carried from the reactor which are precipitated and scrubbed out in the direct cooling apparatus used according to the present invention by means of the (for example sprayed) cooling liquid. The precipitated dust can be removed by, optionally, discharging part of the condensed fluidizing gas/cooling liquid mixture from the direct cooling apparatus. In this way, it may be possible to dispense with a dust precipitator downstream of the reactor and/or the disengagement zone of the reactor, which is usually a pear-shaped widening of the cylindrical part of the fluidized-bed reactor.

BRIEF DESCRIPTION OF DRAWINGS

Further advantages of the gas-phase polymerization process of the present invention using a direct cooling apparatus are illustrated by the preferred embodiments described below.

EXAMPLE 1

Figure 1:
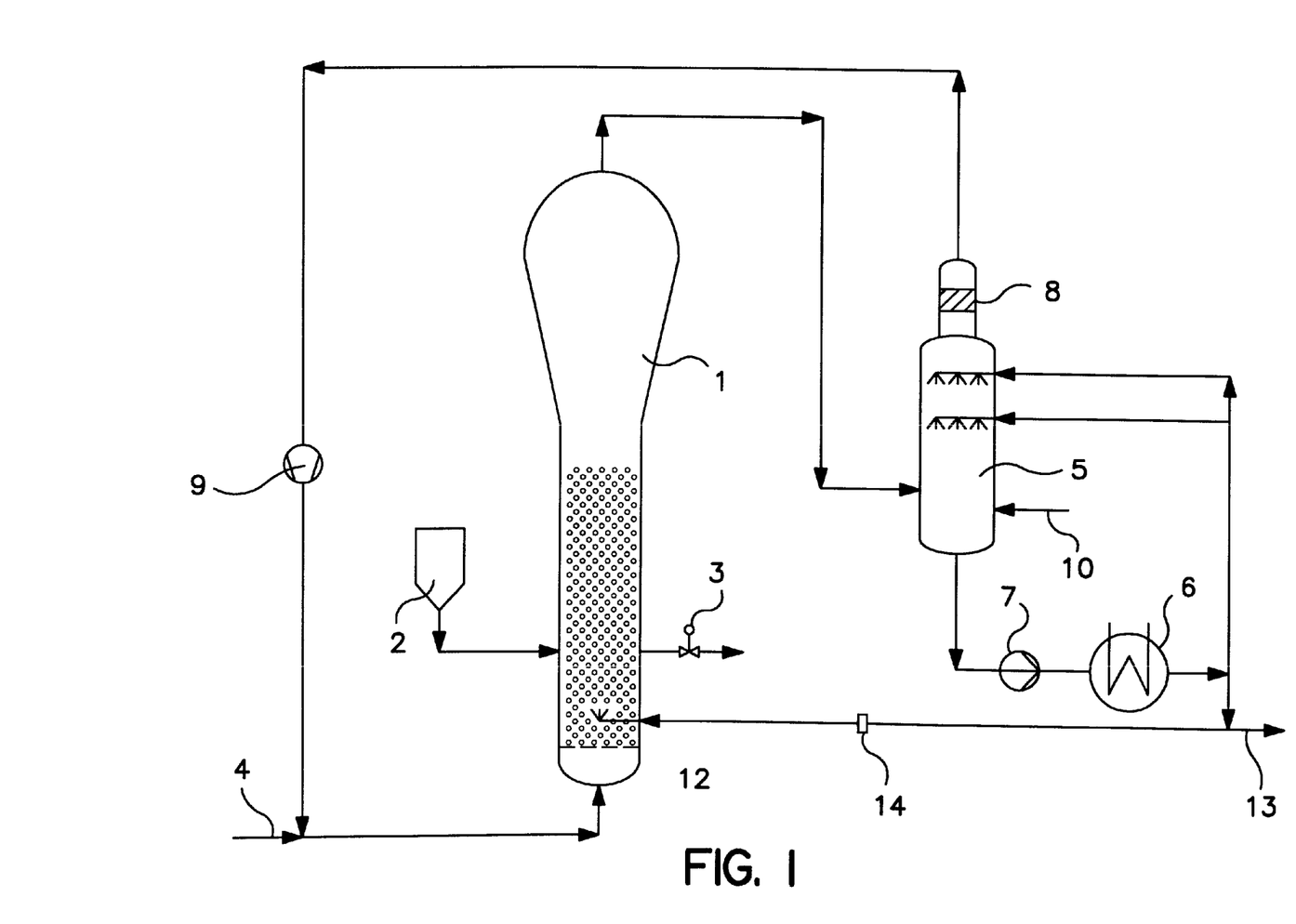

FIG. 1 schematically shows a preferred embodiment of the gas-phase polymerization process of the present invention.

In the fluidized-bed reactor (1), the polymerization of olefins is carried out in the following manner: a gas stream enters the reactor from below and keeps the polymer which foams in a fluidized state; the polymer is formed by means of addition of one or more catalysts or cocatalysts which are introduced via the feed device (2). Optionally, further components such as antistatics, comonomers, hydrogen, etc., can be introduced via such feed devices (2). Such components may also be introduced into the recirculated gas stream before it enters the reactor. The pulverulent polymer is generally discharged by continuous or intermittent opening of one or more closure devices (3) into a vessel under lower pressure, from where it then goes to further processing steps. The gas stream which maintains the fluidized bed and comprises as essential component the monomer which is introduced into this gas stream, for example at (4), heats up as a result of the exothermic reaction of the monomer to form the polymer. To keep the reaction stable, precisely that quantity of heat which is evolved in the reaction has to be removed from the reactor system, taking account of the enthalpies of the streams which are introduced and discharged. Typical conditions in the reactor are:

The temperature of the exiting fluidizing gas stream is from 80° C. to 115° C. at a pressure of from 10 to 25 bar, preferably from 18 to 22 bar. This gas stream (referred to as circulated or fluidizing gas) is then cooled by bringing it into contact with a liquid stream which is cooler than the gas stream (referred to as cooling liquid) in a direct cooling apparatus or in a contact apparatus (5); the liquid stream leaving this heat exchanger is in turn recooled by means of an indirect heat exchanger (6) and fed back into the contact apparatus (5). A pump (7) circulates the liquid stream. The gas stream which has been cooled by direct contact with the colder liquid stream is, optionally after passing through a droplet precipitator (8), returned to the reactor by means of a transport device (9). The amount of monomer required to replace that consumed in polymer formation is added, as mentioned above, during this procedure. Depending on the physical conditions (pressure, temperature, phase equilibrium behavior, process engineering parameters of gas/liquid contact), the components of the fluidizing gas dissolve and condense in the cooling liquid, or components of the cooling liquid go over into the fluidizing gas. A steady state between the gas stream leaving the direct cooler and the cooling liquid is established provided that all the operating parameters remain unchanged.

The excess of liquid resulting from the condensation of preferably relatively high-boiling components of the fluidizing gas and optionally from the introduction of fresh cooling or scrubbing liquid (e.g. at (10)) is introduced in condensed form into the reactor. In FIG. 1, this is shown schematically as spraying of this liquid into the reactor at (12). Optionally, a substream is also discharged from the direct cooling system, for example at (13), to remove any precipitated dust or to set or regulate particular reaction conditions.

In addition, the filter (14) can serve to hold back any precipitated dust and to protect the injection device or the nozzles. The stream to be fed in condensed form into the reactor may, optionally, additionally be cooled further by indirect heat exchange (not shown).

To cool the heated gas directly by means of a cool liquid, it is necessary to create an appropriate liquid/gas contact area. The direct cooling apparatus or the contact apparatus (5) can therefore comprise, for example, a slender vessel in which one or more layers of one or more nozzles distribute the cooling liquid and collector trays located between the layers of nozzles collect the liquid and thus make it possible for the liquid throughput to be closely matched to the gas throughput.

Other embodiments of direct cooling are also possible, for example tray columns or packed columns into which liquid is fed in cocurrent or countercurrent. The direct cooling apparatus can also have a droplet precipitator (8), for example a mesh precipitator or plate precipitator of the type known in the industry.

EXAMPLE 2

Figure 2:
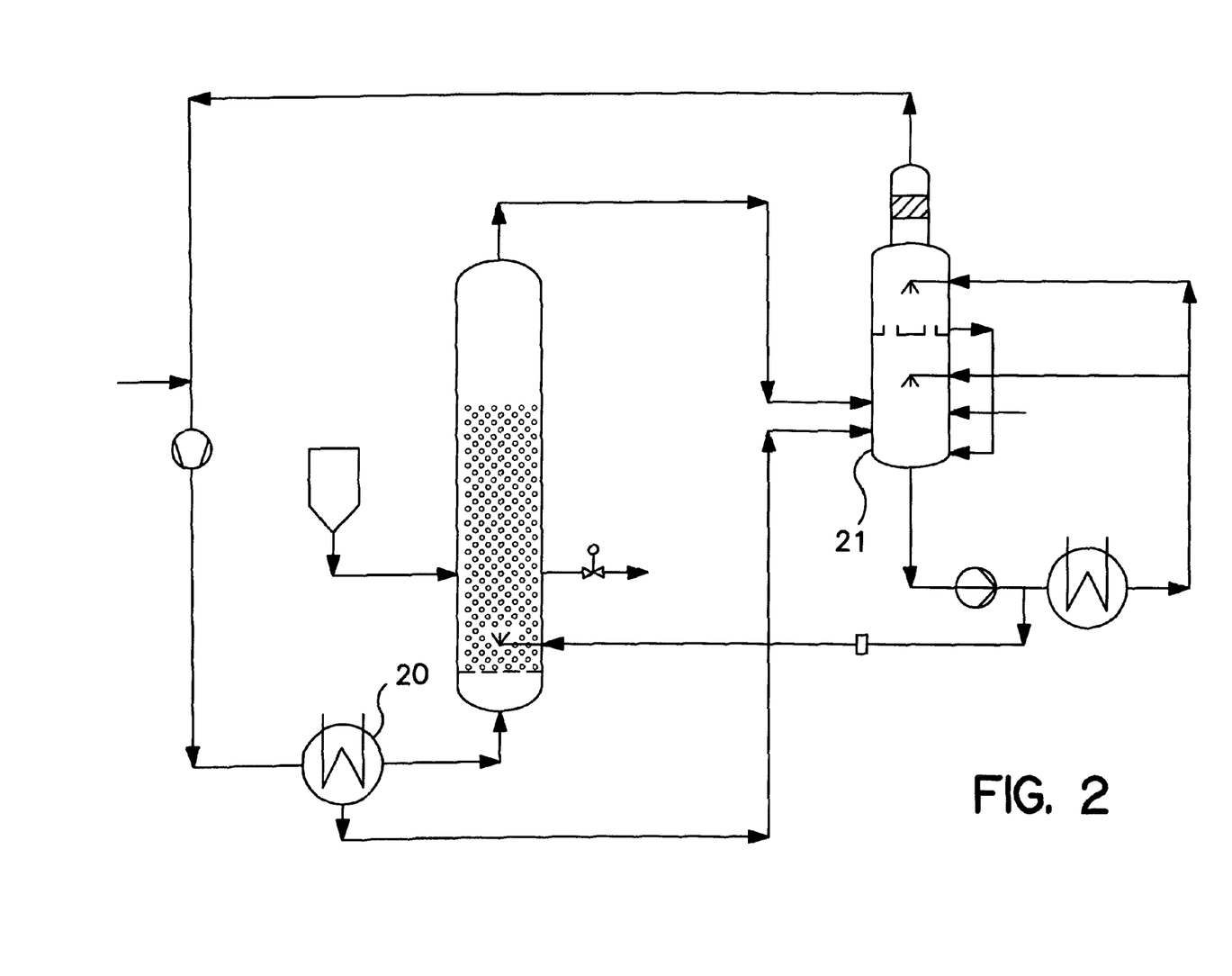

FIG. 2 shows a further preferred illustrative embodiment of the present invention.

Here, only part of the total heat to be withdrawn from the system is removed by means of direct cooling. Conventional, i.e. indirect, heat exchange by means of a shell-and-tube heat exchanger or plate heat exchanger (20) or the like, which is supplied with coolant (for example cooling water), takes place, for example, downstream of the transport device (9) (e.g. a turbo compressor). This indirect heat exchange can also occur in a plurality of indirect heat exchangers connected in series or in parallel and supplied with identical or different coolants. Any condensate formed in the heat exchanger (20) or in a separator integrated therein or installed downstream can be used in the direct cooling apparatus, either alone, for example at (21), or together with other liquids as cooling liquid for direct heat exchange.

EXAMPLE 3

Figure 3:
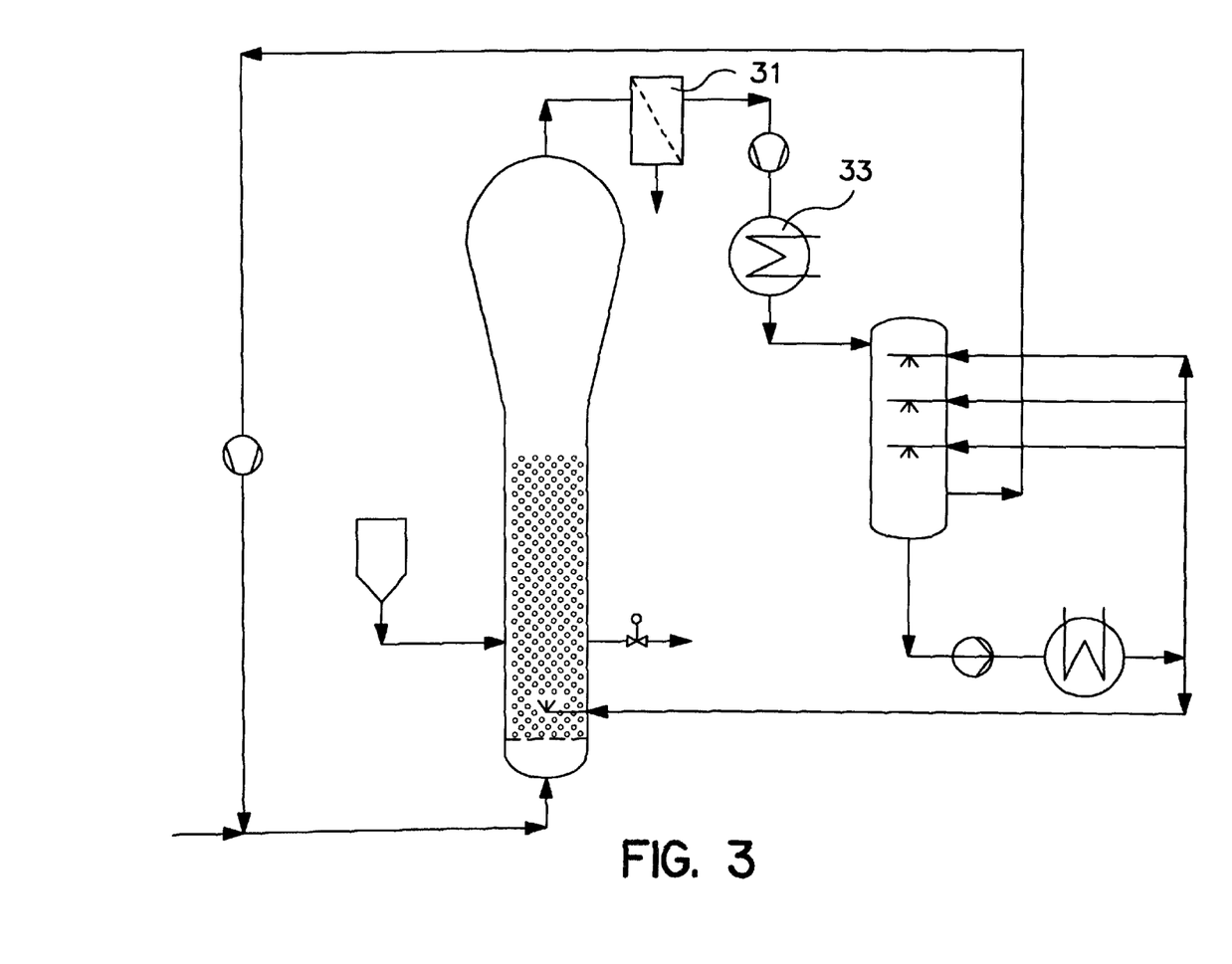

FIG. 3 schematically shows a further preferred illustrative embodiment which corresponds essentially to the example depicted in FIG. 1. The gas leaving the fluidized-bed reactor is, optionally after precipitation of fine dust (31), for example by means of a cyclone or filter, compressed and is fed via a conventional heat exchanger (33), i.e. an indirect heat exchanger, to the direct cooling apparatus as in Example 1.

EXAMPLE 4

Figure 4:
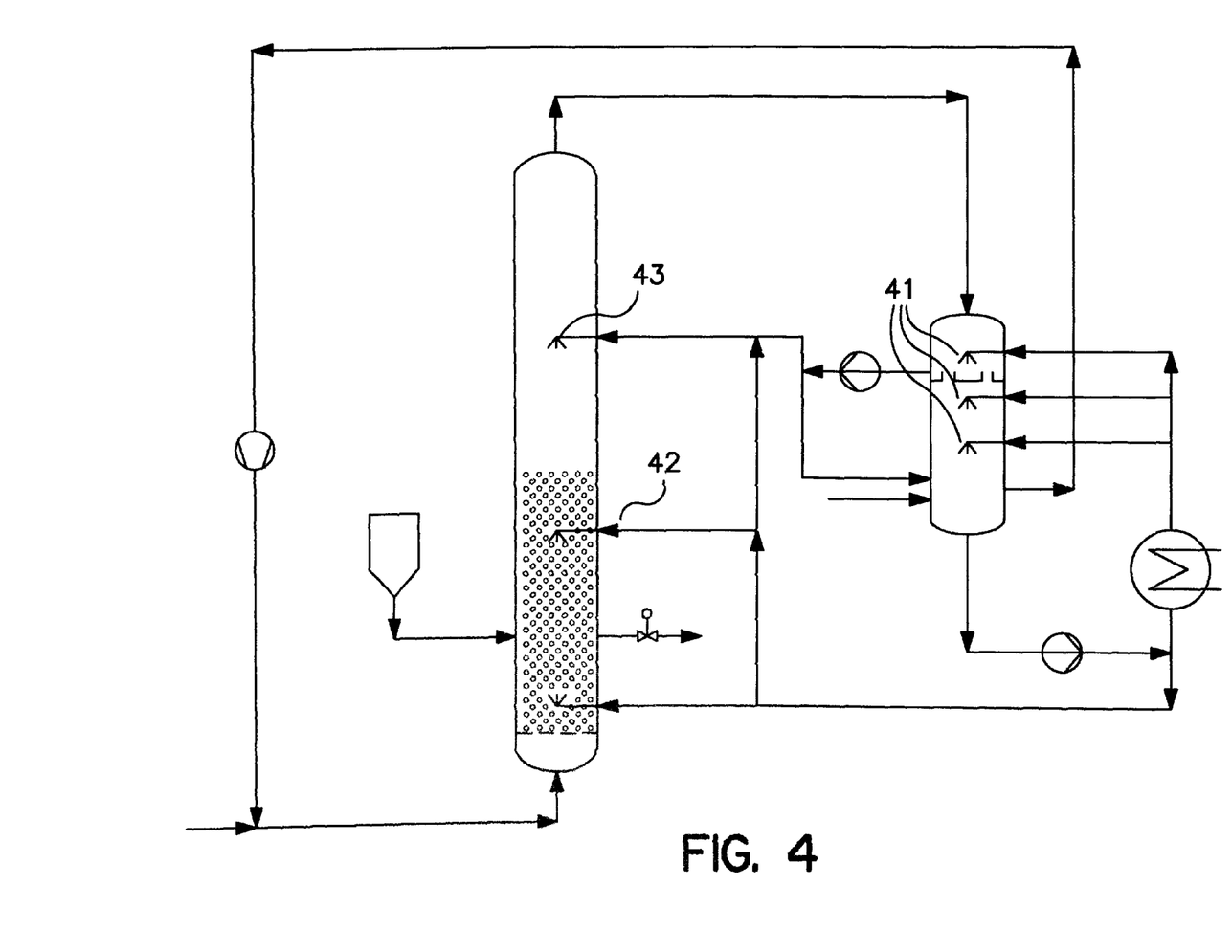

FIG. 4 schematically shows a further preferred illustrative embodiment of the process of the present invention which is based on the modifications described below of the illustrative embodiments described in the preceding examples. The gas leaving the fluidized-bed reactor (1) is conveyed into the direct cooler, with the contact apparatus (5) here being operated in cocurrent, which means that both the fluidizing gas and the cooling liquid flow downward from the top and in the process come into intimate contact with one another. Particularly efficient heat and mass transfer is brought about in this way. The cooling liquid in the contact apparatus can be distributed in one or more levels (41), and the cooling liquid from the individual liquid inlets can likewise be collected and discharged separately on the respective levels by means of one or more collector trays, for example, in particular, on the level where the gas enters and where it is possible not only to cool the gas but also to substantially scrub out any dust carried from the reactor.

Likewise, the excess cooling liquid can be injected into the reactor at any point, i.e. on various levels (42) below and/or above the fluidized-bed and/or at the level of the fluidized-bed. Spraying-in through nozzles which are located above the fluidized bed reduces the proportion of fine dust entrained in the gas.

EXAMPLE 5

Figure 5:
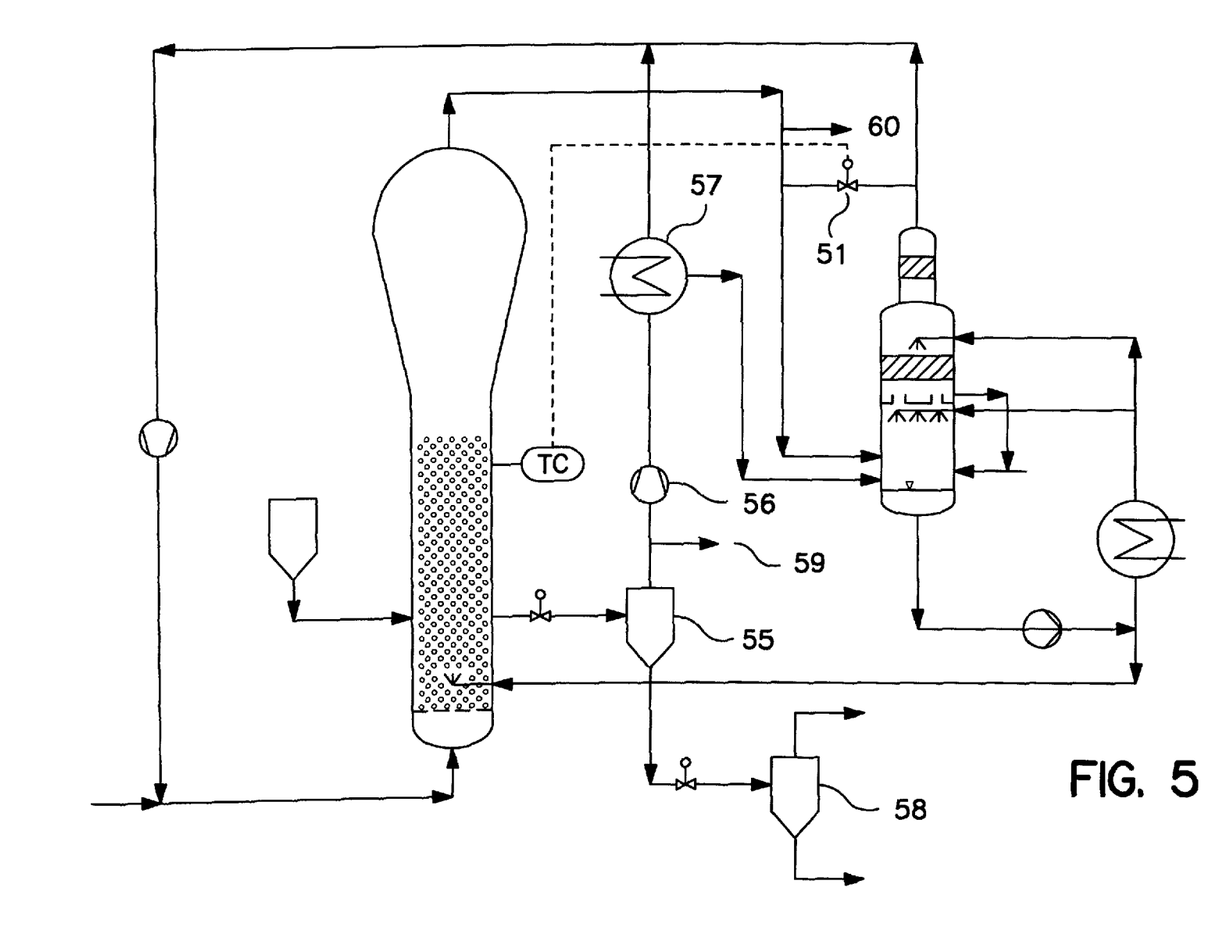

The illustrative embodiment according to the present invention shown in FIG. 5 likewise includes a direct cooling apparatus analogous to that in the process described in Example 1. In the present example, the direct cooling apparatus or contact apparatus for direct cooling (5) is shown as a countercurrent apparatus having one level of nozzles and trickle packing with collector trays. In addition, a temperature and start-up regulator, configured as a bypass regulator (51) around the direct heat exchange, is shown in simplified form. In the reaction system shown, the polymer is discharged via one or more closure devices (3) into the first separation stage (55). The gas stream separated off there, referred to as carrier gas, is brought from the pressure prevailing there, which is significantly below that in the reactor, for example from 5 to 11 bar, back to the reactor pressure by means of the transport device (56). The gas stream can then be precooled by means of an indirect heat exchanger (57) and the cooled gas can be added to the stream to be recirculated to the reactor and any condensate obtained can be introduced into the direct cooling apparatus.

From the separator (55), the polymer is in turn discharged continuously or intermittently at from 1 to 5 bar together with some gas into a region of low pressure, namely the separator (58). The gas stream released in this separator is taken off, optionally together with a purge gas stream or the like fed in at (58). The polymer leaves the separator for further work-up. A waste gas stream may likewise be discharged from the separator (55) at (59), and a further waste gas stream may likewise be discharged at, for example, (60).

We claim:

1. A continuous gas-phase polymerization process for preparing polyolefins, in which the fluid olefin monomers is/are polymerized in the polymerization zone of at least one fluidized-bed reactor in the presence of one or more catalysts under reaction conditions where the fluidizing gas is circulated to remove the heat of polymerization or reaction and the polymerization product is taken from the circuit and the corresponding amount of monomer and, optionally, comonomers and optionally further auxiliaries are fed in, wherein the fluidizing gas discharged from the fluidized-bed reactor is cooled by means of a direct cooling apparatus in which the coolant is brought into direct contact with the fluidizing gas and heated coolant is passed to at least one further cooling stage in order to cool it and is, after cooling, wholly or partly returned to the direct cooling apparatus and/or heated or cooled coolant is wholly or partly returned to the fluidized-bed reactor.

2. A gas-phase, polymerization process as claimed in claim 1, wherein part of the fluidizing gas is cooled to below the dew point.

3. A gas-phase polymerization process as claimed in claim 1, wherein the fluidizing gas is, returned in gaseous form and/or in condensed form and/or as a two-phase mixture, optionally together with a coolant, to the fluidizing gas circuit.

4. A gas-phase polymerization process as claimed in claim 1, wherein the cooled fluidizing gas together with any cooling liquid which may be present is introduced into a droplet precipitator prior to being returned to the fluidized-bed reactor.

5. A gas-phase polymerization process as claimed in claim 1, wherein the coolant comprises an inert cooling liquid, an unsaturated cooling liquid and/or a cooling liquid mixture of two or more of the abovementioned cooling liquids.

6. A gas-phase polymerization process as claimed in claim 1, wherein the cooled fluidizing gas together with any cooling liquid present is introduced in gaseous form and/or in condensed form and/or as a two-phase mixture into the fluidized-bed reactor at one or more points above and/or below the fluidized bed and/or at the level of the fluidized bed.

7. A gas-phase polymerization process as claimed in claim 1, wherein the fluidizing gas is compressed before or after entry into the direct cooling apparatus.

8. A gas-phase polymerization process as claimed in claim 1, wherein the direct cooling of the fluidizing gas is carried out wholly or partly in a liquid compressor.

9. A gas-phase polymerization process as claimed in claim 1, wherein the direct cooling apparatus is operated in cocurrent, in countercurrent and/or in the crossflow mode.

10. A gas-phase polymerization process as claimed in claim 1, wherein the direct cooling apparatus has coolant distributing devices, baffles, gas/liquid contact trays, collector trays and/or packing.

11. A gas-phase polymerization process as claimed in claim 1, wherein the direct cooling apparatus comprises a purifying apparatus for purifying the fluidizing gas.

12. A gas-phase polymerization process as claimed in claim 1, wherein olefinic monomer(s), and, optionally, an olefinic comonomer, is/are introduced directly into the cooled fluidizing gas stream to be returned before it enters the fluidized-bed reactor or is/are introduced directly into the fluidized bed reactor.

13. A gas-phase polymerization process as claimed in claim 1, wherein from 2 to 10 fluidized-bed reactors and/or polymerization reactors are used.

14. The process of claim 1 wherein the fluidizing gas is, after a purification step, returned in gaseous form and/or in condensed form and/or as a two-phase mixture, optionally together with a coolant to the fluidizing gas circuit.

15. A gas phase polymerization process as claimed in claim 1, wherein the fluidizing gas is returned in gaseous for and/or in condensed form and/or as a two-phase mixture, optionally together with a coolant, to the fluidized-bed reactor.

16. The process of claim 5 wherein the coolant comprises a saturated branched, unbranched or cyclic hydrocarbon having from 4 to 12 carbon atoms.

17. The process of claim 16 wherein the hydrocarbon comprises pentane.

18. The process of claim 16 wherein the hydrocarbon comprises hexane and/or the condensate of the fluidizing gas and/or a mixture of olefinic monomers, olefinic comonomers, oligomers and/or reaction products thereof.

19. The process of claim 12 wherein the olefinic monomer(s) has 2 to 4 carbon atoms and, optionally, includes an α-olefin comonomer having 2 to 8 carbon atoms.

* * * * *

UNITED STATES PATENT AND TRADEMARK OFFICE
CERTIFICATE OF CORRECTION

PATENT NO.     : 6,472,482 B1                                                                 Page 1 of 1
DATED          : October 29, 2002
INVENTOR(S)    : Evertz et al.

It is certified that error appears in the above-identified patent and that said Letters Patent is hereby corrected as shown below:

Column 10,
Line 40, "gaseous for" should be -- gaseous form --.

Signed and Sealed this

Eighteenth Day of February, 2003

JAMES E. ROGAN
*Director of the United States Patent and Trademark Office*